US009907116B2

(12) United States Patent
Coersmeier

(10) Patent No.: US 9,907,116 B2
(45) Date of Patent: Feb. 27, 2018

(54) POWER-EFFICIENT INTELLIGENT RECEPTION

(75) Inventor: Edmund Coersmeier, Bochum (DE)

(73) Assignee: Nokia Technologies Oy, Espoo (FI)

(*) Notice: Subject to any disclaimer, the term of this patent is extended or adjusted under 35 U.S.C. 154(b) by 483 days.

(21) Appl. No.: 11/685,593

(22) Filed: Mar. 13, 2007

(65) Prior Publication Data

US 2008/0139213 A1 Jun. 12, 2008

(30) Foreign Application Priority Data

Dec. 6, 2006 (EP) .................................... 06025242

(51) Int. Cl.
*H04W 88/10* (2009.01)
*H04W 48/18* (2009.01)

(52) U.S. Cl.
CPC ............ *H04W 88/10* (2013.01); *H04W 48/18* (2013.01); *Y02B 60/50* (2013.01)

(58) Field of Classification Search
CPC ....... H04W 88/10; H04W 48/18; Y02B 60/50
USPC .......................................... 455/552.1, 553.1
See application file for complete search history.

(56) References Cited

U.S. PATENT DOCUMENTS 5,175,729 A * 12/1992 Borras et al. ................. 370/345
6,744,814 B1 * 6/2004 Blanksby et al. ............ 375/232
7,876,808 B2 * 1/2011 Catreux-Erceg et al. .... 375/140
2004/0141548 A1 * 7/2004 Shattil ........................... 375/146
2005/0032480 A1 * 2/2005 Lee et al. ........................ 455/76
2005/0186921 A1 * 8/2005 Hoo et al. ..................... 455/121

FOREIGN PATENT DOCUMENTS

| | | |
|---|---|---|
| EP | 1089578 | 4/2001 |
| EP | 1503603 | 2/2005 |
| EP | 1566917 | 8/2005 |
| GB | 2266433 | 10/1993 |
| WO | WO-01/90890 | 11/2001 |
| WO | WO-02/069648 | 9/2002 |

OTHER PUBLICATIONS

Catalog entry for "Recurrent Neural Networks for Prediction: Learning Algorithms, Architectures and Stability," http://www.wiley.com/WileyCDA/WileyTitle/productCd-0471495174.html.

(Continued)

*Primary Examiner* — Nathan Mitchell
(74) *Attorney, Agent, or Firm* — Alston & Bird LLP

(57) ABSTRACT

Embodiments of the present disclosure relate to a method, system, apparatus, receiver module, and computer program product which may provide a power-efficient reception. In an example embodiment, at least one spectrum available for a desired communication may be scanned, and available communication channels may be categorized based on at least one determined channel property. A communication channel may be selected from the available communication channels based on the result of the categorization, and complexity of a receiver processing may be set based on the at least one channel property of the selected communication channel. Complexity of the receiver processing may be reduced in light of the property of the selected channel, so that power consumption may be kept low.

28 Claims, 3 Drawing Sheets

(56) References Cited

OTHER PUBLICATIONS

Cabric, D., et al.; "Implementation Issues in Spectrum Sensing for Cognitive Radios;" dated Nov. 2004; dated accessed Oct. 9, 2012; $38^{th}$ Annual Asilomar Conference on Signals, Systems and Computers; http://128.32.63.27/php/pubs/pubs.php/257/asilomar_paper_danijela.pdf.

FCC Et docket 03-322; "Notice of Proposed Rule Making and Order;" dated Dec. 30, 2003; dated accessed Oct. 9, 2012; http://www.cs.ucdavis.edu/~liu/289I/Material/FCC-03-322A1.pdf.

International Search Report and Written Opinion of the Searching Authority for Application No. PCT/EP2007/010614, dated May 9, 2008.

* cited by examiner

POWER-EFFICIENT INTELLIGENT RECEPTION

Applicant hereby claims priority under 37 C.F.R § 1.55 based on EP Patent Application Number EP 06 025 242.6, filed in the European Patent Office on Dec. 6, 2006, entitled "Power-Efficient Intelligent Reception," the disclosure of which is hereby incorporated by reference.

TECHNICAL FIELD

The present disclosure relates to a method, system, apparatus, receiver module, and computer program product for providing power-efficient reception.

BACKGROUND

Spectrum availability at frequencies that can be economically used for wireless communications may be unsatisfactory. This problem may become apparent, for example, when referring to the FCC (Federal Communications Commission) frequency chart. The FCC frequency chart indicates multiple allocations over all available frequency bands. As a result, there is competition for the use of spectra, such as in the bands below 3 GHz. However, according to D. Cabric, S. M. Mishra, and R. W. Brodersen, "Implementation Issues in Spectrum Sensing for Cognitive Radios", $38^{th}$ Annual Asilomar Conference on Signals, Systems and Computers, November 2004, actual measurements taken in an urban setting may reveal a typical utilization of 0.5% in the 3-4 GHz frequency band. The utilization may even drop to 0.3% in the 4-5 GHz band. Thus, spectrum shortage may partially be the result of regulatory and licensing processes.

The current approach for spectrum sharing is regulated so that wireless systems are assigned fixed spectrum allocations, operating frequencies and bandwidths, with constraints on power emission that may limit their range. Therefore, some communications systems may be designed to achieve the best possible spectrum efficiency within the assigned bandwidth using sophisticated modulation, coding, multiple antennas, and other techniques. The most advanced systems are approaching Shannon's channel capacity limit, so further increases in capacity would require additional system bandwidth. On the other hand, the discrepancy between spectrum allocation and spectrum use suggests that spectrum shortage could be overcome by allowing more flexible usage of a spectrum. Flexibility could mean that radio terminals could find and adapt to any immediate local spectrum availability.

Notice of Proposed Rule Making and Order, December 2003, a new radio class, so-called "cognitive radio", is described, that may be able to reliably sense the spectral environment over a wide bandwidth, detect the presence/absence of legacy users (primary users), and use the spectrum only if the communication does not interfere with primary users.

In general, a cognitive radio—as its name implies—carries a level of cognition or intelligence that permits decision-making and learned patterns of behaviour. According to the Institute of Electrical and Electronics Engineers (IEEE), the cognitive radio may be a radio transmitter that is designed to intelligently detect whether a particular segment of the radio spectrum is currently in use and to jump into (or out of) a temporarily unused spectrum very rapidly without interfering with transmissions of other users. To achieve this, the wireless network or a wireless node itself may be configured to change particular transmission parameters to execute tasks efficiently without interfering with licensed users. The parameter alteration may be based on observations of several factors, such as, for example, radio frequency spectrum, user behaviour, network state etc., so that the radio spectrum may be utilized more efficiently. More specifically, the radio transmitter (e.g., mobile terminal, mobile phone, user equipment, or the like) may be configured to scan its environment, decide on the best frequency band as well as transmission standard, and indicate to the other connection end (e.g., base station, access node, or the like) which transmit power, channel pre-equalization and pre-coding schemes should be used.

The cognitive radio concept may utilize flexible implementation on various layers. The physical layer may require more flexibility than currently known from traditional non-cognitive radio standards. This flexibility may be achieved for the physical layer baseband processing by a software defined radio (SDR) implementation. SDRs may rely on embedded software for their functionality and configuration. Assuming it is clear which task a user wants to solve (voice call, data download, location tracking etc.), the cognitive radio may select a corresponding technology (e.g., Global System for Mobile communication (GSM), Wireless Local Area Network (WLAN), Global Positioning System (GPS) etc.).

In application specific integrated circuit (ASIC) implementations for conventional non-cognitive radios, the most critical case for wireless channel estimation plus channel decoding may be assumed, and thus maximum possible algorithm performance may be targeted by implementing algorithms for a worst case scenario, which may require high complexity. As already mentioned above, in cognitive radios, a spectrum scanner may identify available spectrum resources and provide this information to a cognitive radio transmitter for corresponding transmission parameter selection.

FIG. 2 shows a graph indicating processor load for different radio algorithms (decoding, channel estimation, frequency synchronization and timing synchronization) running concurrently on a floating point digital signal processor (DSP) of an orthogonal frequency division multiplexing (OFDM) SDR. It can be seen that channel estimation and decoding algorithms may require the most DSP processor load in this OFDM radio. The more critical the channel properties are, the more sophisticated baseband algorithms may need to be used for channel estimation and channel decoding. This may lead to high processing loads and corresponding high power consumption, which may be undesirable in certain situations, such as for some mobile terminals.

SUMMARY

One example embodiment may include scanning at least one communication spectrum available for a desired communication, categorizing available communication channels based on at least one determined channel property, selecting a communication channel from said available communication channels based on the result of said categorization, and setting complexity of a receiver processing based on the at least one channel property of said selected communication channel.

Another example embodiment may include a spectrum scanner, a channel analyzer, a channel selector, and a setting unit. The spectrum scanner may be configured to scan at least one communication spectrum available for a desired communication. The channel analyzer may be configured to categorize available communication channels based on at least one determined channel property. The channel selector may be configured to select a communication channel from said available communications channels based on the result of said categorization. The setting unit may be configured to set a complexity of a receiver processing based on the at least one channel property of said selected communication channel.

Another example embodiment may be a receiver unit including a spectrum scanner, a channel analyzer, a channel selector, and a setting unit. The spectrum scanner may be configured to scan at least one communication spectrum available for a desired communication. The channel analyzer may be configured to categorize available communication channels based on at least one determined channel property. The channel selector may be configured to select a communication channel from said available communications channels based on the result of said categorization. The setting unit may be configured to set a complexity of a receiver processing based on the at least one channel property of said selected communication channel.

Another example embodiment may be a computer program product including code for causing a computer device to scan at least one communication spectrum available for a desired communication, categorize available communication channels based on at least one determined channel property, select a communication channel from said available communication channels based on the result of said categorization, and set complexity of a receiver processing based on the at least one channel property of said selected communication channel.

BRIEF DESCRIPTION OF THE DRAWINGS

The present disclosure will now be described on the basis of embodiments with reference to the accompanying drawings.

DETAILED DESCRIPTION

An example embodiment will now be described based on a software-based cognitive radio apparatus, such as an SDR, which may be configured to scan the environmental frequency spectrum and to decide on the best frequency band, as well as transmission standard, based on the scanning result. The radio apparatus may be any type of device, component, circuit, module etc., such as—but not limited to—a cellular telephone, a handheld computer, a multimedia device, or an integrated chip. The apparatus may be employed in any wired or wireless communication network, such as those which allow exchange of different types of data traffic based on a layered protocol stack which may be in conformity with the International Organization for Standardization (ISO) Open Systems Interconnection (OSI) Reference Model (OSI/RM). Physical layer functions may realize signaling for the specific transmission medium, and may be interfaced with a data link layer through a handshaking protocol. Even though cognitive radios may be different from traditional wireless radios, the cognitive radio framework may be based on the ISO/OSI layering methodology, according to an example embodiment.

Figure 1:
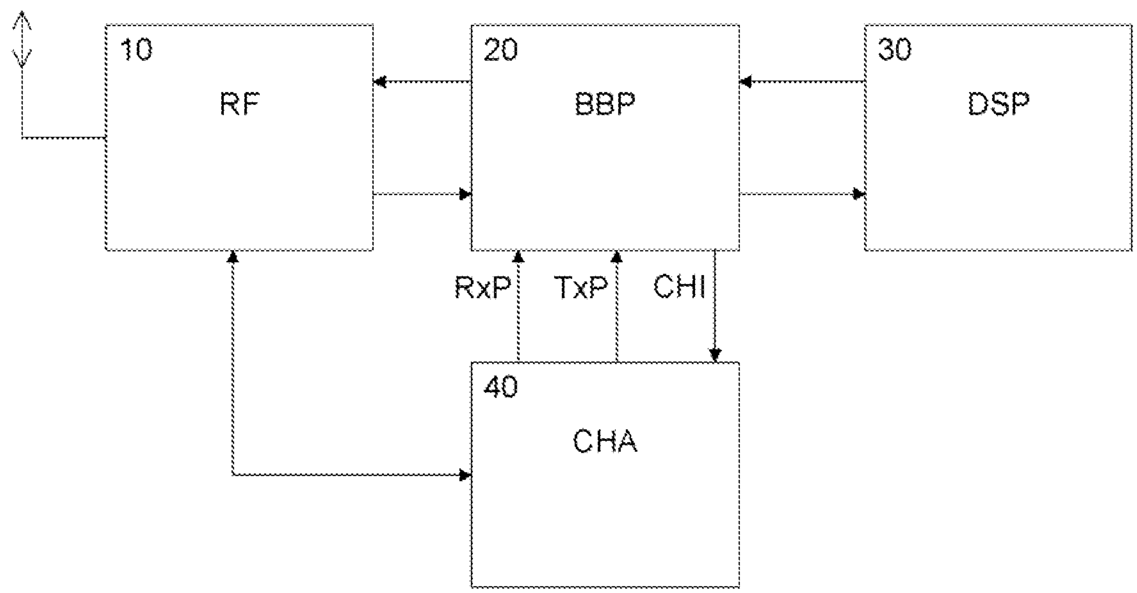
FIG. 1 shows a schematic block diagram of a cognitive radio receiver apparatus according to an example embodiment.

FIG. 1 shows a schematic block diagram of an exemplary configuration of a cognitive radio transceiver apparatus according to an example embodiment. The transceiver apparatus may be a mobile terminal, user equipment or other wireless transmit/receive unit which comprises a transmitter functionality or module and a receiver functionality or module.

In this example embodiment, the radio apparatus may comprise a wideband radio frequency (RF) front-end 10 capable of simultaneous sensing of a wide spectrum, such as several GHz for example. The wideband RF signal presented at an antenna of such a front-end 10 may include signals from close and widely separated transmitters, and/or from transmitters operating at widely different power levels and channel bandwidths. The analog RF font-end 10 may be connected, such as via an analog-to-digital conversion portion (not shown), for example, to a digital baseband processing unit (BBP) 20 which may be implemented as a software-controlled processor or computer unit. In the baseband processing unit 20, converted reception signals may be subjected to a receiver processing, while transmission signals to be transmitted by the RF front-end 10 may be subjected to a transmitter processing. The receiver processing and transmitter processing may be performed in different processing paths or channels, such as those indicated by the arrows in FIG. 1.

Furthermore, a channel analyzation unit (CHA) 40 may be provided, which may control a spectrum scanning operation performed by the RF font-end 10 and which may analyse channel property or channel condition information CHI provided by the baseband processing unit 20 as a result of the spectrum scanning operation. The transmission and reception signals may be further processed by a digital signal processor (DSP) 30 coupled to the baseband processing unit 20.

Cognitive radio communication may utilize reliable detection of unoccupied spectrum. This reliable detection may establish a functionality on the physical layer for spectrum sensing over all available degrees of freedom (time, frequency, and space) in order to identify frequency bands currently available for transmission. A challenge of spectrum sensing may be the detection of weak signals in noise with a small probability of miss detection. Spectrum sensing may require the radio apparatus to receive a wideband signal through the RF front-end 10, sample it by a high speed analog-to-digital (A/D) converter (not shown), and perform measurements for detection of primary user signals. After identifying an available spectrum segment, the channel analyzation unit (CHA) 40 may control the baseband processing unit 20 by supplying corresponding transmission processing parameters TxP to provide modulation schemes that provide best spectrum utilization and capacity, while avoiding interference to any primary user. Furthermore, the transmission scheme may be flexible to allow assignments of any band to any user, and may be scalable with the number of users and bands. A transmission signal may thereby be created, which may adaptively change the occupied bandwidth without causing interference to any active primary users.

The wideband RF front-end 10 may be enhanced by an antenna array for spatial filtering. This array may be implemented as a phased antenna array where the antenna array coefficients may be computed in the digital domain, e.g., by the baseband processing unit 20 in response to corresponding processing parameters supplied by the channel analyzation unit 40, and fed back to adjust the gains and phases of the antenna elements. A simple algorithm for computation of coefficients could be derived by noticing that strong primary users occupy distinct frequency bands and spatial directions of arrival. In order to obtain an estimate of angles of arrivals, the antenna array coefficients may sweep through many directions.

After reliable reception and sampling of a wideband signal, digital signal processing techniques may be utilized at the baseband processing unit 20 to further increase radio sensitivity by processing gain, and for primary user identification based on knowledge of the signal characteristics. Detection techniques may be based on matched filters, energy detectors, or cyclostationary feature detectors, in example implementations. Channel selection may be performed based on at least one of processing gain required for a given probability of detection, sensitivity to unknown noise and interference, and implementation complexity.

To keep the power consumption low, the channel analyzation unit 40 may be configured to decide on the best transmission parameters TxP (which may be used for controlling transmit power, channel coding etc.), and additionally may also choose the best quality wireless channel to ensure that the radio receiver portion can reduce computational complexity as much as possible because of preferred wireless channel conditions.

Figure 2:
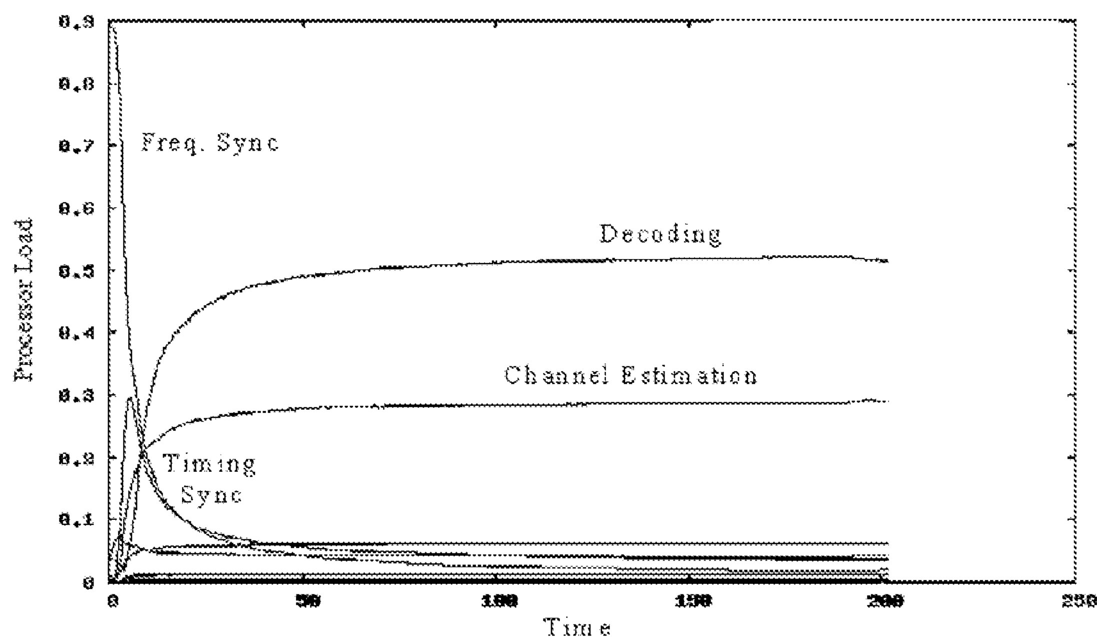
FIG. 2 shows a graph indicating processing load of different receiver algorithms according to an example embodiment.

As already described above in connection with FIG. 2, it can be seen that in this example OFDM radio apparatus, channel estimation and channel decoding algorithms may require the most processor load at the baseband processing unit 20. The more critical the channel properties are, the more sophisticated baseband algorithms may be used for channel estimation and channel decoding. The more relaxed the wireless channel conditions are, the less complex algorithms may be used. The channel analyzation unit 40 may therefore be configured to first analyze channel conditions and then adapt the receiver algorithms to the channel conditions or properties of the selected channel. This may be achieved, for example, by applying a suitable reception processing parameter RxP to the baseband processing unit 20.

Thus, the reception parameters RxP may be adapted to employ simple receiver algorithms, e.g., for channel estimation and channel decoding, if the cognitive radio apparatus has been able to select a high quality channel (nearly ideal channel conditions). Otherwise, more complex algorithms may be used in the receiver processing to handle more critical channel conditions, which may have been identified before by the scanning operation of the channel analyzation unit 40.

The spectrum scanning operation controlled or performed by the channel analyzation unit 40 may identify available spectrum resources and provide information for corresponding selection of transmission parameter TxP (e.g., transmit power, channel coding scheme etc.). Additionally, independent of the transmitter parameter selection, the channel conditions or properties (e.g. channel state information) may also be taken into account for optimizing receiver processing at the baseband processing unit 20. Thus, the channel analyzation unit 40 may utilize the derived channel information for adapting transmitter and receiver operations.

Due to the fact that the channel information derived from the scanning operation may be taken into account, receiver algorithm complexity can be adapted to the channel conditions or properties and may not be defined based on worst case considerations. Thus, the reception processing parameters may be selected or set based on the actual channel properties to provide a predetermined receiver performance enough or sufficient for the desired purpose or application. The choice of receiver processing algorithms may be made independent from the transmit scheme, and may be realized because the channel conditions are interpreted. This adaptive complexity of receiver processing may be employed in a flexible and fast manner, such as in software-based radio implementations. This may provide sufficient flexibility to configure the receiver complexity during run-time.

The enhanced spectrum scanner operation performed or controlled by the channel analyzation unit 40 may involve scanning the frequencies of the available spectrum and choosing a best or desired frequency band and corresponding technology (e.g., GSM, 3G, WLAN etc.) depending on the desired application. Then, after deciding the desired frequency band, the channel with the best channel properties may be identified inside that frequency band. Based on the channel conditions or properties (e.g. signaled channel state information), only a minimum of receiver algorithm complexity may be selected, e.g., by applying a corresponding set of reception processing parameters RxP.

Figure 3:
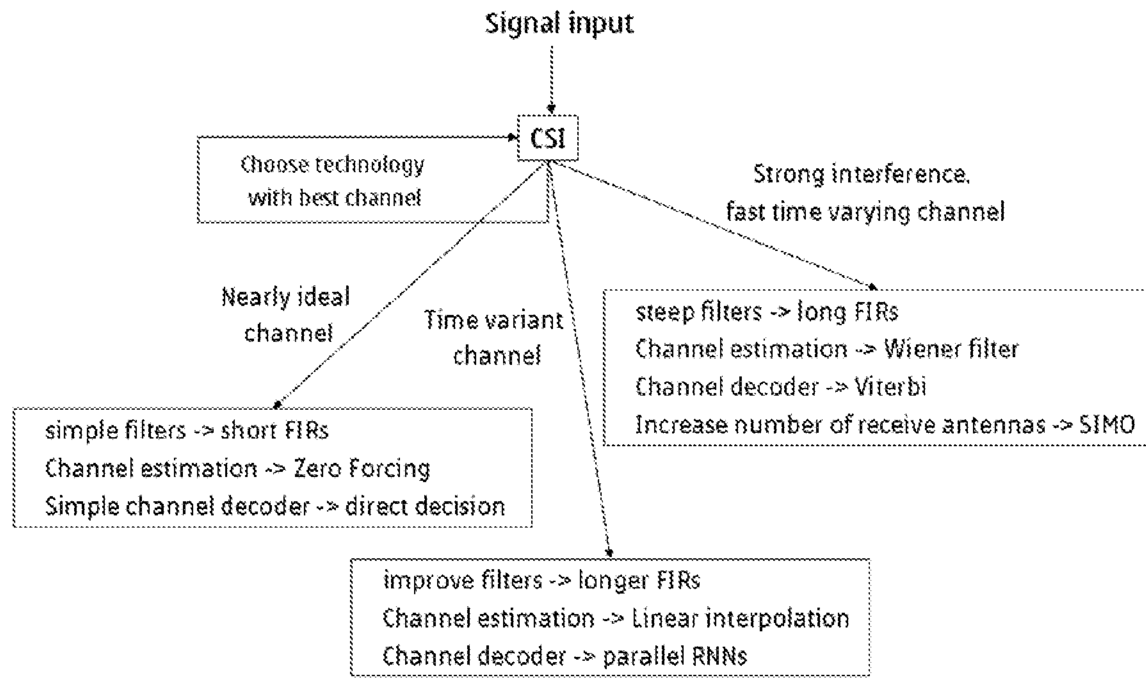
FIG. 3 shows a schematic diagram indicating selection of different receiver setups according to an example embodiment.

FIG. 3 shows a schematic diagram indicating an exemplary implementation example, in which different receiver setups may be selected. After scanning the spectrum, the scanner function of the channel analyzation unit 40 may identify or detect the channel state information (CSI) of different free channels in one possible band. The better the channel conditions are, the less complex receiver algorithms may be required. According to the example embodiment shown in FIG. 3, the selected channels may be categorized, e.g., based on the identified CSI, into "simple, nearly ideal channel", "increasing channel imperfections" (multipath, AWGN (Average White Gaussian Noise) type of noise, etc,), and "highly critical channel" (which may require high receiver complexity). Of course, other alternative or additional categories could be defined as well.

The left box shows a receiver setup with simplest low performance algorithms, which may not require much computational complexity and which may be selected for the above case of "nearly ideal channel". The algorithms may involve simple filter processing with short digital filter chains (e.g., finite impulse response (FIR) filters), zero forcing processing as channel estimation, and direct decision processing as a simple channel decoder. This may be adequate because the channel may be, in some cases, nearly ideal. Channel estimation may be simple and channel decoding can be performed via direct decision.

The central box of FIG. 3 may be associated with a more critical channel, and may be selected for the above case of "increasing channel imperfections", e.g., due to a time variant channel. The algorithms may involve improved filter processing with longer digital filter chains, linear interpolation processing as channel estimation, and parallel recurrent neural networks (RNN) as the channel decoder. The amount of data processing in the receiver may rise because channel estimation may become more complex and channel decoding may require more knowledge about channel codes.

Finally, the example implementation shown in the right-hand box may employ computationally complex algorithms, and may be selected for the above case of "highly critical channel", e.g., a fast time-varying channel with strong interference. Algorithms which equalize such a critical channel and decode the code sequence correctly may utilize high amounts of power. The algorithms may involve steep filter processing with long digital filter chains, Wiener filter processing as channel estimation, and Viterbi processing as channel decoder. As an additional option, additional receiver branches (SIMO (Single Input Multiple Output) instead of SISO (Single Input Single Output) receiver), or at least one of a number of receiving antennas and a number of transmitting antennas, may be selected by providing a phased array antenna. In this regard it is noted that, besides the number of receiving antennas, also the number of transmission antennas may influence the complexity of receiver processing. More specifically, the more transmitting antennas are combined, e.g., with good transmit diversity schemes like Alamouti, the more the receiver complexity may be reduced.

The choice of which box (i.e., processing algorithms) should be chosen may be performed by the proposed cognitive spectrum scanning function of the channel analyzation unit 40, which, in an example embodiment, may select not just any free channel, but may select a free channel with the best or predetermined properties, e.g., in terms of noise, multipath or Doppler influence.

The corresponding receiver algorithm complexity selection may be independent of the transmitter specification, because different receiver algorithms may fulfill the same receiver tasks (channel estimation, channel decoding . . . ) with different mathematical complexity and different performance.

Figure 4:
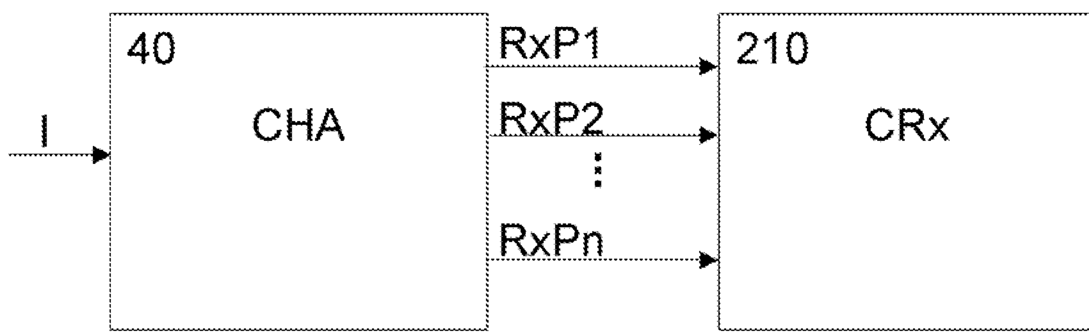
FIG. 4 shows a schematic block diagram of a setting functionality for parameter-based selection of processing complexity according to an example embodiment.

FIG. 4 shows a schematic block diagram of a setting functionality for parameter-based selection of processing complexity according to an example embodiment. The setting functionality may be provided in the channel analyzation unit 40 which may be adapted to generate, based on a scanning input signal I received from the RF font-end 10, a set of reception processing parameters RxP1 to RxPn. The set of reception processing parameters RxP1 to RxPn may be used for controlling, establishing, or setting up the above or other processing algorithms at a cognitive receiver processing part 210 of the baseband processing unit 20. The cognitive receiver processing part 210 may be implemented as a software routine controlling a processing or computer unit of the baseband processing unit 20 based on the set of reception processing parameters RxP1 to RxPn, or as a hardware-implemented digital processing circuit which may be controlled by the set of reception processing parameters RxP1 to RxPn.

Figure 5:
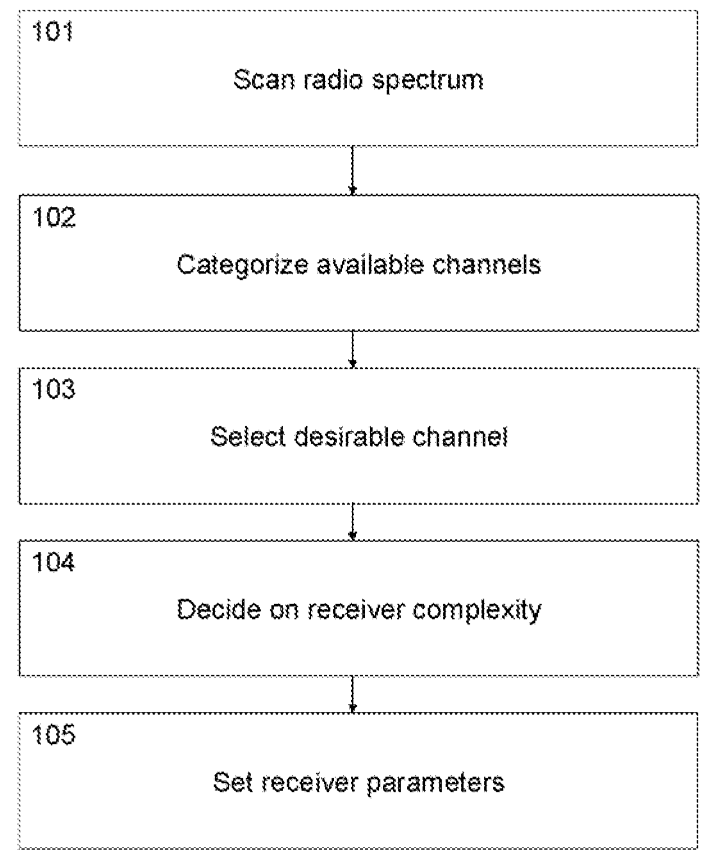
FIG. 5 shows a schematic flow diagram of a complexity setting operation according to an example embodiment.

FIG. 5 shows a schematic flow diagram of a complexity setting operation according to an example embodiment. This operation may be provided as a software function or routine as a part of the overall spectrum scanner functionality implemented in the channel analyzation unit 40 and/or the baseband processing unit 20.

In block 101, the analog RF front-end 10 may be controlled to scan the radio spectrum. In block 102, the baseband processing function 20 and/or the channel analyzation unit 40 may perform a rough channel analysis to categorize the actual or available channel(s) based on their conditions or properties, e.g., into quality levels as indicated in FIG. 3. In block 103, the channel analyzation unit 40 may select, after comparing different available channels, the best, preferred or simplest channel with most ideal (or at least sufficient) properties. The channel analyzation unit 40 may decide in block 104 on the required receiver processing complexity. This decision may be based on a fixed parameter allocation, such as in the example indicated in FIG. 3. In block 105, the channel analyzation unit 40 may inform transmitter and receiver processing portions of the baseband processing unit 20 of the decided processing parameters, e.g., by setting the transmission and reception processing parameter TxP1 to TxPn and RxP1 to RxPn. Thus, based on the channel quality analysis, the receiver processing portion may be controlled and acquire an indication how complex the receiver algorithms should be.

Figure 6:
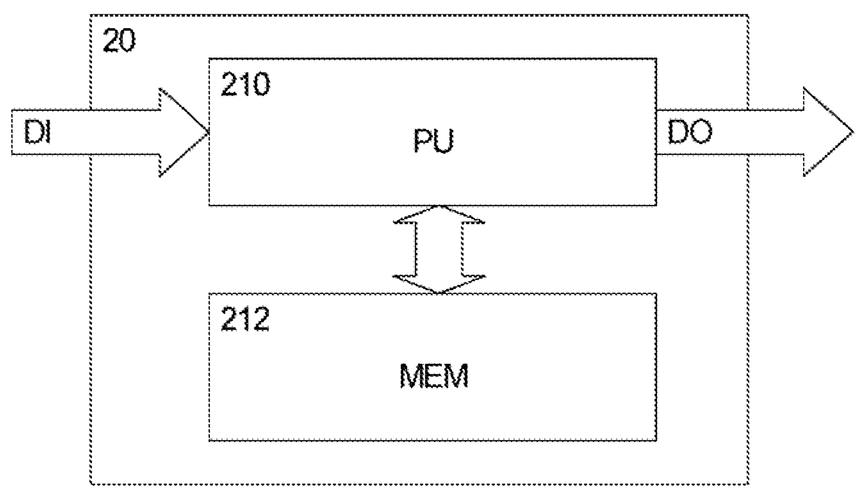
FIG. 6 shows a schematic block diagram of a computer-implemented example embodiment.

FIG. 6 shows a schematic block diagram of a software-based implementation of the proposed functionalities for achieving channel-sensitive complexity adjustment, according to an example embodiment. These functionalities may be implemented with a processing unit 210, which may be any processor or computer device with a control unit which performs control based on software routines of a control program stored in a memory 212. Program code instructions may be fetched from the memory 212 and may be loaded to the control unit of the processing unit 210 in order to perform the processing operations of the above functionalities described with reference to the respective blocks of FIGS. 1, 4, and 6. These processing operations may be performed on the basis of input data DI and may generate output data DO. The input data DI may correspond to the input signal I, which may be derived from the spectrum scanning operation at the RF front-end 10; the output data DO may correspond to the set of parameters RxP1 to RxPn and TxP1 to TxPn or any other control information provided to achieve complexity control.

According to the example embodiments discussed above, complexity of receiver processing may be reduced based on the property of the selected channel, so that power consumption may be reduced. This may lead to considerable power reduction in the processing for physical layer baseband, e.g., software processing in SDRs. Thus, if the receiver takes channel conditions or channel properties into account (e.g., by using channel state information or the like), it may choose a corresponding receiver algorithm complexity which would not be sufficient for worst case considerations (like in conventional (ASIC) receivers) but which fits to the actual channel properties to provide enough receiver performance. This choice of algorithms may be independent of transmit scheme, and may be realized in any type of intelligent receiver (such as cognitive radio or intelligent wired receivers) because such receivers may be configured to interpret channel conditions or properties and may employ flexible SDR implementation. These SDR or other software-based receiver implementations may be flexible enough to configure receiver complexity during run-time.

The setting of the complexity may be performed independent of a transmission scheme selected for the desired communication.

Furthermore, the receiver processing may comprise at least one of channel estimation, channel decoding, filtering, and antenna selection. Then, complexity setting may be performed by at least one of setting complexity of said filtering by selecting a length of a digital filter chain, setting complexity of the channel estimation by selecting between zero forcing, linear interpolation and Wiener filtering, setting complexity of the channel decoding by selecting between direct decision processing, recurrent neural network processing, and Viterbi processing, and selecting a number of receiving antennas and/or a number of transmitting antennas. Of course, only exemplary setting examples are indicated above, which may be modified or replaced by other processing alternatives suitable to provide a range of different processing complexities (which define, e.g., amount of computational calculations, length of processed data words, amount of processing speed, etc.) for the receiving operations. Criteria for the setting operation may determine a minimum complexity sufficient to provide a predetermined receiver performance.

The above setting of the complexity may be achieved by supplying a predetermined set of processing parameters for said receiver processing. This set can then be used to select the processing algorithms or other criteria suitable for controlling complexity of the receiver processing.

In fast systems, such as software-base setting or control systems, the setting of the complexity may be performed during run-time of the desired communication.

The above setting operations may be performed by the setting unit of the above apparatus.

The at least one determined channel property may be indicated by using a channel state information.

Various embodiments relating to a method, system, apparatus, receiver module and computer program product have been described, for example, for providing a power-efficient reception, wherein a spectrum available for a desired communication is scanned and available communication channels are categorized based on at least one determined channel property. Also, for example, a communication channel may be selected from the available communication channels in dependence on the result of the categorization, and complexity of a receiver processing is set in dependence on the at least one channel property of the selected communication channel. In an example embodiment, in some cases, complexity of the receiver processing may be reduced, e.g., so that power consumption may decreased.

The present disclosure is not restricted to the embodiments described above, but may be implemented in any communication apparatus with a receiver functionality for any type of wired or wireless application. As an example, at least one spectrum may be shared in a cable, optical fiber, or other type of electrical, magnetic, electro-magnetic or optical waveguide. The processing operations of FIG. 6 may be implemented as discrete digital circuits, modules or logical signal processing structures. The number of categories for channel selection and complexity allocation may differ from the example of FIG. 3, and may even be replaced by individual channel decisions made by the channel analyzation unit 40 based on a comparison of channel information, such as the CSI or other quality-based parameters, derived from the spectrum scanning operation. The embodiment may thus vary within the scope of the attached claims.

The invention claimed is:

1. A method comprising:
- scanning at least one communication spectrum available for a desired communication;
- categorizing available communication channels from the communication spectrum based on channel state information of the communication channels;
- selecting a communication channel from said available communication channels based on said categorizing;
- setting complexity of filtering by selecting a length of a digital filter chain based on the channel state information of said selected communication channel; and
- setting complexity of channel decoding based on the channel state information, wherein the channel state information comprises one or more quality-based parameters.

2. The method of claim 1, further comprising performing said setting of said complexity of filtering independent from a transmission scheme selected for said desired communication.

3. The method of claim 1, further comprising:
- performing channel estimation based on the channel state information; and
- setting complexity of said channel estimation by selecting between zero forcing, linear interpolation and Wiener filtering for the channel state estimation.

4. The method of claim 1, wherein:
- the method further comprises antenna selection by selecting at least one of a number of receiving antennas and a number of transmitting antennas based on the channel state information.

5. The method of claim 1, wherein:
- the method further comprises setting said complexity of filtering by supplying a predetermined set of processing parameters for said receiver processing.

6. The method of claim 1, further comprising performing said setting of said complexity of filtering during run-time of said desired communication.

7. The method of claim 1, wherein said setting of said complexity of filtering comprises setting a minimum complexity sufficient to provide a predetermined receiver performance.

8. An apparatus comprising at least one processor and at least one memory including computer program code, the at least one memory and the computer program code configured to, with the processor, cause the apparatus to at least:
- scan at least one communication spectrum available for a desired communication;
- categorize available communication channels from the communication spectrum based on channel state information of the communication channels;
- select a communication channel from said available communication channels based on said categorization;
- set a complexity of filtering by setting the length of a digital filter chain based on the channel state information of said selected communication channel; and
- set complexity of channel decoding based on the channel state information, wherein the channel state information comprises one or more quality-based parameters.

9. The apparatus of claim 8, wherein setting said complexity of filtering is independent from a transmission scheme selected for said desired communication.

10. The apparatus of claim 8, wherein the at least one memory and the computer program code are further configured to, with the processor, cause the apparatus to:
- set complexity of channel estimation by selecting between zero forcing, linear interpolation, and Wiener filtering.

11. The apparatus of claim 8, wherein the at least one memory and the computer program code are further configured to, with the processor, cause the apparatus to:
- set complexity of at least one of channel estimation, channel decoding, filtering, and antenna selection; and
- select antennas by selecting at least one of a number of receiving antennas and a number of transmitting antennas based on the channel state information.

12. The apparatus of claim 8, wherein the at least one memory and the computer program code are further configured to, with the processor, cause the apparatus to supply a predetermined set of processing parameters for said receiver processing.

13. The apparatus of claim 8, wherein the at least one memory and the computer program code are further configured to, with the processor, cause the apparatus to:

set said complexity of filtering during run-time of said desired communication.

14. The apparatus of claim 8, wherein the at least one memory and the computer program code are further configured to, with the processor, cause the apparatus to:

set a minimum complexity of filtering sufficient to provide a predetermined receiver performance.

15. The apparatus of claim 8, wherein the at least one memory and the computer program code are further configured to, with the processor, cause the apparatus to: communicate within a communication system.

16. The apparatus of claim 8, wherein the apparatus further includes a transmitter, and the apparatus is configured as a transceiver.

17. A receiver module comprising:

a spectrum scanner configured to scan at least one communication spectrum available for a desired communication;

a channel analyzer configured to categorize available communication channels from the communication spectrum based on channel state information of the communication channels;

a channel selector configured to select a communication channel from said available communication channels based on said categorization; and a setting unit configured to set a complexity of filtering by setting the length of a digital filter chain based on the channel state information of said selected communication channel, wherein:

said setting unit is further configured to set complexity of channel decoding based on the channel state information, wherein the channel state information comprises one or more quality-based parameters.

18. The receiver module of claim 17, wherein the receiver module is configured as a wireless terminal device.

19. The receiver module of claim 17, wherein the receiver module is configured as a mobile station.

20. The receiver module of claim 17, wherein the receiver module is configured as a wireless access device.

21. The receiver module of claim 17, wherein the receiver module is configured as a base station.

22. A computer program product comprising a non-transitory computer readable memory in which are stored computer program code instructions for causing a computer device to:

scan at least one communication spectrum available for a desired communication;

categorize available communication channels from the communication spectrum based on channel state information from the communication channels;

select a communication channel from said available communication channels based on said categorizing;

set complexity of filtering by setting the length of a digital filter chain based on the channel state information of said selected communication channel, and set complexity of channel decoding based on the channel state information, wherein the channel state information comprises one or more quality-based parameters.

23. The method of claim 1, wherein the channel state information comprises interference information.

24. The apparatus of claim 8, wherein the channel state information comprises interference information.

25. The receiver of claim 17, wherein the channel state information comprises interference information.

26. The computer program product of claim 22, wherein the channel state information comprises interference information.

27. The method of claim 1, further comprising:

setting complexity of said channel decoding by selecting between direct decision processing, recurrent neural network processing, and Viterbi processing.

28. The apparatus of claim 8, wherein the at least one memory and the computer program code are further configured to, with the processor, cause the apparatus to select between direct decision processing, recurrent neural network processing, and Viterbi processing.

* * * * *